W. S. CLYMANS.
Grain-Separator.

No. 160,750. Patented March 16, 1875.

WITNESSES:
Jas. R. Hutchinson
R. W. Hister

INVENTOR:
William S. Clymans
Edson Bro's.
Attorneys

UNITED STATES PATENT OFFICE.

WILLIAM S. CLYMANS, OF BURNT CABINS, PENNSYLVANIA.

IMPROVEMENT IN GRAIN-SEPARATORS.

Specification forming part of Letters Patent No. 160,750, dated March 16, 1875; application filed January 25, 1875.

*To all whom it may concern:*

Be it known that I, WILLIAM S. CLYMANS, of Burnt Cabins, in the county of Fulton and State of Pennsylvania, have invented certain new and useful Improvements in Grain-Separators; and I do hereby declare that the following is a full, clear, and exact description thereof, which will enable others skilled in the art to which it pertains to make and use the same, reference being had to the accompanying drawings and to the letters of reference marked thereon, which form a part of this specification, in which—

Figure 1:
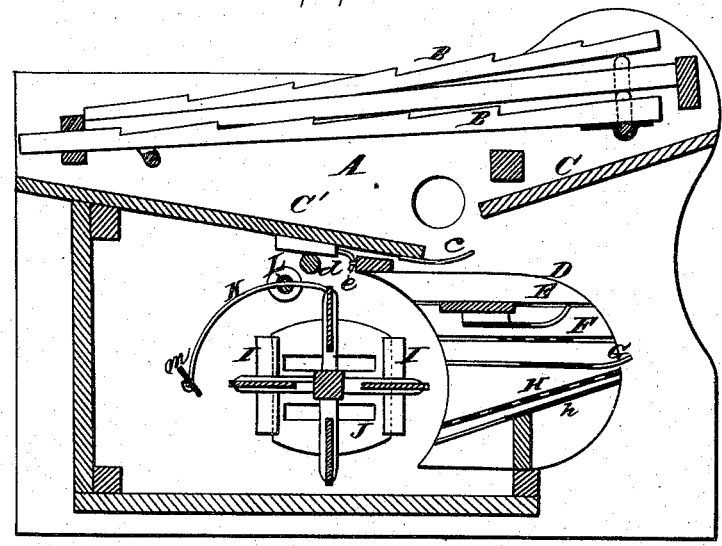
Figure 2:
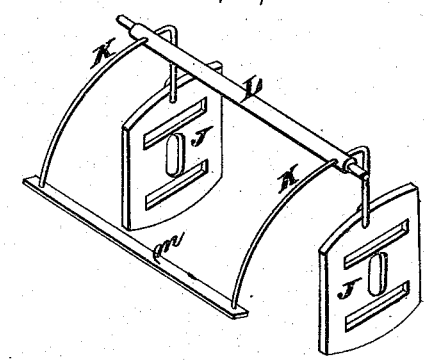

Figure 1 is a vertical longitudinal section of my improved grain-separator, and Fig. 2 is a detached perspective view of the blast-regulator.

Corresponding parts in the several figures are denoted by like letters.

This invention relates to a certain improvement in grain-separators; and it consists of a wind-board connected to slides by levers whose fulcrum is a rocking shaft, substantially as hereinafter more fully specified.

In the annexed drawing, A refers to the sides of the separator, of which only one is shown. In the upper part of the separator are a series of notched or serrated bars, B B, journaled upon cranks, by which they are vibrated, the function of said bars being to separate or shake the grain from straw, &c. The grain falls on and is conducted by the inclined boards C C' to a toothed or pronged plate, c, at the lower end of the board C', between the teeth of which it passes, and falls on the first toothed plate of the shaker, which will be described. D is the shaker, of ordinary construction, located within the separator, and connected to the bowed or crank shaft d by the rod or connecting-bar e, by which, through the assistance of belts and pulleys, the shaker is vibrated in separating the grain. E is the upper toothed or pronged plate of the shaker D, the one above mentioned as that upon which the grain falls from the pronged plate c. The grain falls from this plate upon a perforated plate or screen, F, thence upon a second toothed plate, G, and finally upon a second perforated plate or screen, H, all arranged in the shaker D, the screen H inclining inwardly, as does also the board h beneath it. I is the fan, hung in the sides of the separator, in proximity with the screens, &c., of the shaker D.

The blast-regulator consists of the following parts: the slides J J and lever or levers K K, with their vertical or short arms attached to the slides, and their long arms passing through or attached to an axis or fulcrum, L, bearing in the sides of the separator, and united at their ends by a broad bar, m. The horizontal openings in the slides J J correspond to openings made in the sides of the separator, the vertical ones being to permit of the passage of the fan-shaft.

It will be observed that, as the blast produced by the fan and the air admitted through the openings in the separator become so great as to force the bar m downwardly, the slides J J will ascend and close the said openings, and thus lessen the force of the blast.

When the blast is not sufficient to keep the bar m in its depressed position, it will, of course, rise, causing the slides J J to descend and open the said openings again for the admission of air, when the force of the blast will be increased, and thus maintain a proper and uniform blast.

This regulator is susceptible of attachment to any separator, and consequently can be made and sold separately as a grain-separator attachment.

Having thus described my invention, what I claim, and desire to secure by Letters Patent, is—

The combination of wind-board m, levers K on rocking-shaft L, and slides J, as and for the purpose set forth.

In testimony that I claim the foregoing as my own I affix my signature in presence of two witnesses.

WILLIAM S. CLYMANS.

Witnesses:
 G. ELLIOTT,
 WM. I. McCOY.